A. S. KROTZ.
TANDEM DISK HARROW.
APPLICATION FILED JUNE 30, 1919.

1,409,218.

Patented Mar. 14, 1922.
2 SHEETS—SHEET 2.

Inventor
Alvaro S. Krotz
By his Attorney
Lloyd Blackmore

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

TANDEM-DISK HARROW.

1,409,218.  Specification of Letters Patent.  Patented Mar. 14, 1922.

Application filed June 30, 1919. Serial No. 307,761.

*To all whom it may concern:*

Be it known that I, ALVARO S. KROTZ, a citizen of the United States, and resident of Janesville, Rock County, State of Wisconsin, have invented certain new and useful Improvements in Tandem-Disk Harrows, of which the following is a specification.

My invention relates to tandem disk harrows of the type or class having two pairs of angularly adjustable disk gangs located one pair to the rear of the other, and the individual disk gangs of each pair upon opposite sides of a central line through which the pull exerted upon the harrow is applied; and particularly to tandem disk harrows of the class above referred to and in which means are provided for adjusting the angular position of the several separate disk gangs relative to the central line of the harrow and relative to the line of tractive force applied thereto.

One object of my invention is to provide a tandem disk harrow in which the rear disk gangs will follow the front disk gangs better, and keep in a definite relation thereto, as regards the paths of travel of the disks of the two gangs, better than has heretofore commonly been the case, whereby a more uniform action of the disks upon the ground is secured; while at the same time providing a harrow in which the forward pair of disk gangs may be turned short with reference to the rear disk gangs when the direction of movement of the harrow has to be changed, as at the corners of a field.

A further object of my invention is to provide a tandem disk harrow in which the angular relations between the several individual disk gangs and the center line or line of travel of the harrow may be changed at will, to thereby vary the action of the harrow upon the ground; the change in angular position of the several gangs being effected simultaneously, and the movement of the gangs to bring about the change of position being accomplished with a minimum of effort on the part of the operator; because of the fact that the forces acting upon the several gangs are balanced and in substantial equilibrium, and because of the further fact that the tractive force or pull applied to the harrow is made available for the purpose of moving or assisting in the moving of the several disk gangs when their angular positions are to be changed.

A further object of my invention is to provide a tandem disk harrow having a plurality of angularly adjustable individual disk gangs and in which the adjustment of the said gangs is effected by a single adjusting lever adapted to swing said gangs about the pivotal points of support through which tractive force is transmitted to them; the movement of the said lever to vary the angular position of the gangs relative to the central line of the harrow being preferably assisted by the tractive force transmitted to the harrow.

A further object of my invention is to provide a harrow of the type herein referred to wherein the pair of disk gangs which from the rear unit of the harrow may be readily detached from the front unit, and the front unit or pair of disk gangs used alone.

A further object of my invention is to provide a tandem disk harrow in which the two oppositely disposed disk gangs which constitute the rear unit thereof may be connected with one another either rigidly, so that they will act as a unitary structure, or flexibly, in which case each may act to a considerable degree independently of the other.

A further object of my invention is to provide a tandem disk harrow in which an improved form of connection is provided between the inner abutting ends of the rear disk gangs, and between the said abutting ends and the adjusting member whereby the angular position of said rear gangs relative to the central line of the harrow is varied at the will of the operator.

A further object of my invention is to provide an improved form of pivotal connection between the frames of the pairs of disk gangs and the draw bars through which tractive force is communicated to said gangs.

With the above and other objects of invention in view my invention consists in the improved tandem disk harrow and subordinate parts and auxiliary features thereof illustrated in the accompanying drawings and hereinafter described and claimed; and in such variations and modifications thereof, within the scope of the concluding claims, as will be obvious to those skilled in the art to which my invention relates.

In the drawings accompanying and forming a part of this specification and wherein the preferred embodiment of my invention is illustrated;

Figure 1:
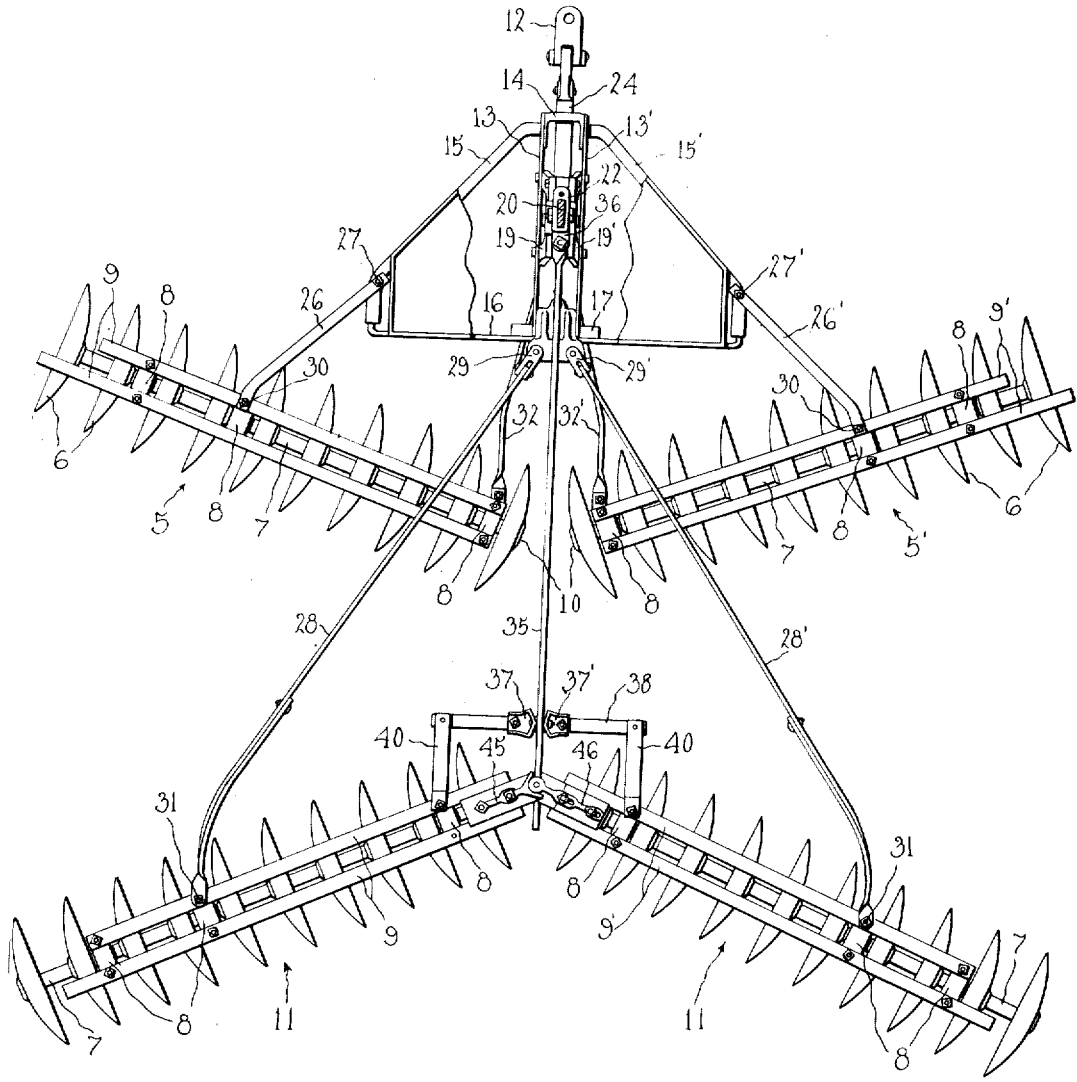
Figure 1 is a view showing my improved tandem disk harrow in plan.

Referring to the drawings, the reference numerals 5, 5' designate the front pair of disk gangs the members of which are located upon opposite sides of the central line of the harrow along which tractive force is communicated thereto and which gangs, when the harrow is in use, are commonly arranged at an angle relative to the line of movement thereof. Each of these disk gangs is made up of a plurality of separate disks 6 all rotatable upon a central shaft or axle 7 supported in bearings 8, as many disks and bearings being provided as may be necessary in each particular case. The bearings are supported by suitable frame members 9, 9' which members obviously support the individual disks of each set of disks in proper rotation one to another and provide a single unitary structure or disk gang.

When the forward pair of disk gangs are inclined in the directions illustrated in Figure 1 and the harrow is in use the action of the disks upon the ground will tend to force each disk gang inward and toward the central line of the harrow, and the inner ends of said gangs may approach one another to such an extent that the enlarged portions or bosses 10 at such ends will contact with one another, thus preventing further movement of the gangs towards one another.

The reference numerals 11, 11' designate a pair of angularly arranged rear disk gangs similar in contsruction to the forward gangs above referred to, and which rear disk gangs are adjustable angularly the same as the front set of gangs. The tendency of these rear disk gangs will be to move apart when the harrow is in use; for which reason their inner ends are secured together in a permanent manner, as will hereinafter appear.

Generally speaking, and except in the particulars hereinafter pointed out, the invention to which this present application relates is in no way concerned with the form or type of the separate disks employed, nor with the details of construction of the individual disk gangs; and any suitable construction and arrangement of disk gangs may be employed in my invention, so long as the resulting harrow is of the class or type referable to as a tandem disk harrow.

Tractive effort or pull is communicated to the several disk gangs through mechanism including a draft frame at the front end of the harrow and which mechanism is pulled through a clevis 12 to which the team or tractor is hitched, and which draft frame may be modified as to its details of construction without departing from my invention. In the form of my invention illustrated, however, the draft frame is made up of two parallel bars 13, 13' spaced apart from one another and the forward ends of which are connected with a guide block 14. Extending rearward from the guide 14 are diverging bars 15, 15', the rear ends of which are connected with a cross bar 16, and which cross bar serves as a support for the rear end of the parallel bars 13, 13'; said bars being connected to the cross bar through a bracket 17 located centrally thereof. A block 18 is secured in place between the rear ends of the bars 13, 13' and two oppositely disposed upwardly extending toothed or notched segments 19, 19' are secured to the bars 13, 13'. The reference numeral 20 designates an upwardly extending adjusting lever located between the segments 19, 19', the said lever being pivotally supported from the segments at 21 so that it may be swung upon said pivot into various front and rear positions in which it may be held by means of a latch member 22 having a tooth at its lower end adapted to engage and interlock with the teeth of the segments 19; this latch member being operated by a handle 23 when the position of the lever is to be varied and the angular positions of the various disk gangs changed.

The clevis 12 is connected with a draw bar or link 24 which extends through the guide 14 above referred to, and the rear end of which is pivotally connected at 25 with the lever 20, in the embodiment of my invention illustrated.

Tractive force or pull applied through the clevis 12 and draw bar 24 is communicated to the draft frame through the segments 19, 19', and from said frame to the several disk gangs 5, 5' and 11, 11' when the harrow is in use through suitable draft mechanism; the connection between the draft mechanism regarded in its entirety and the several disk gangs being adjacent the central positions of the several gangs. In the form of my invention illustrated the forward pair of disk gangs 5, 5' are connected with the rear ends of the diverging bars 15, 15' of the draft frame by means of two draw bars or links 26, 26'; the forward ends of which are pivotally connected with said bars at 27, 27', and the rear ends of which are pivotally connected with the front disk gangs. The draft mechanism for the rear pair of disk gangs 11, 11' is shown as comprising two long draw bars 28, 28', the forward ends of which are pivotally connected with the block 18 through pivotal connections at 29, 29', and the rear ends of which are pivotally connected with the rear disk gangs.

Figure 2:
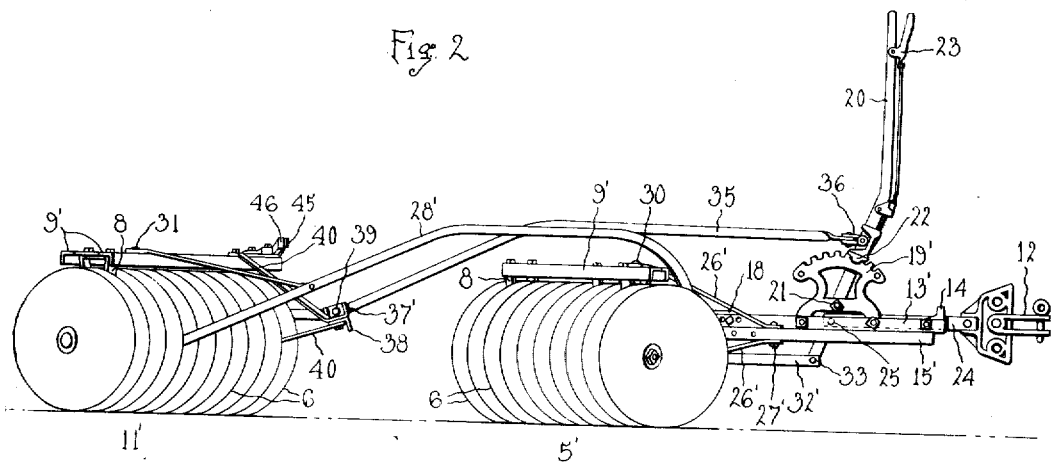
Figure 2 is a view showing the same in side elevation.
Figure 3:
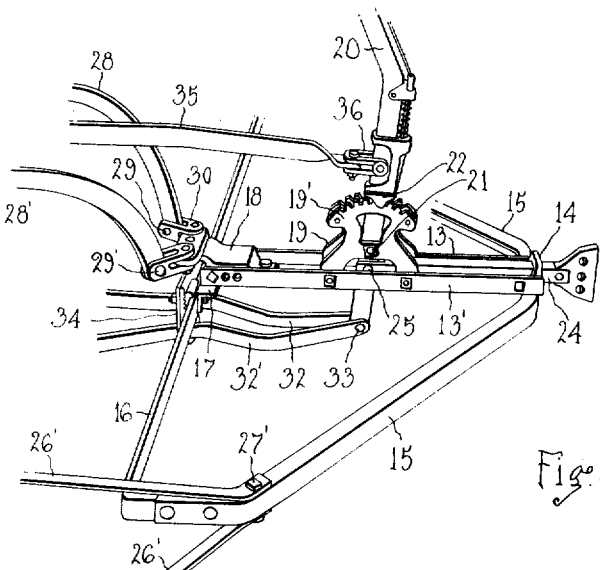
Figure 3 is a fragmentary perspective view upon a somewhat larger scale illustrating the forward end of the harrow and the draft frame through which tractive force is communicated to the various disk gangs which form the same.

Both the draw bars 26, 26' for the forward disk gangs and the draw bars 28, 28' for the rear disk gangs are bifurcated as best shown in Figure 2, the lower branches of said bars extending to and being connected with the disk gangs at about the level of the shafts 7 which support the disks, while the upper branches of said draw bars are connected with the frames of the gangs at points above the disks; whereby two pivotal connections are provided between the rear ends of each draw bar and the disk gangs, the location of said connections being indicated by the reference numerals 30, 31 and the two points of connection being some distance apart vertically but in the same vertical line; thus providing an extended pivotal connection which prevents the frames from tipping and which maintains the frame in an upright position.

The vertically arranged adjusting lever 20 is operatively connected with the several disk gangs 5, 5' and 11, 11' in order to adjust said gangs angularly relative to the center line of the harrow, the connection between the lower end of said lever and the front disk gangs 5, 5' being through and by means of an adjusting device or mechanism made up of two links 32, 32' the forward ends of which are connected with the lower end of the lever 20 at the point 33; while the rear ends of said links are connected with the frame whereby the disks of the front gangs are supported, preferably at about the level of the axis of the shaft which supports the said disks, as shown in Figure 2. The said adjusting links are shown as extending through and guided by a guide 34 secured to the cross bar 16 at the central portion thereof.

The inner ends of the rear disk gangs 11, 11' are connected with the adjusting lever 20 through an adjusting mechanism device in the form of a bar 35, the forward end of which is pivotally connected with the lever 20 through a universal joint at 36; it being appreciated that the points 33 and 36 at which the forward ends of the adjusting bar 35 and the adjusting bars 32 are connected with the lever 20 are respectively above and below the point 21 of pivotal connection between the said lever and the segments 19.

In the form of my invention illustrated the adjusting bar 35 after passing rearward above the front disk gangs 5, 5' is bent downward, and extends to and between the inner ends of the rear disk gangs 11, 11', as will be understood from Figures 1, and 2; the rear end of said bar being operatively connected with the inner ends of the said rear gangs through mechanism including lugs or brackets 37, 37' secured to a cross bar 38 and between which lugs the bar extends, the bar being secured in place between the lugs and a loose connection being provided at this point by a bolt 39 extending through holes in the lugs and bar. The free outer ends of the cross bar 38 are pivotally connected with links 40, the rear ends of which are in turn pivotally connected with the frame members of the rear disk gangs, from which it follows that a loose connection is provided between the adjusting bar 35 and the frame members through the several pivotal connections aforesaid of the connecting mechanism between the rear end of the bar and the inner ends of the pair of rear disk gangs.

Figure 4:
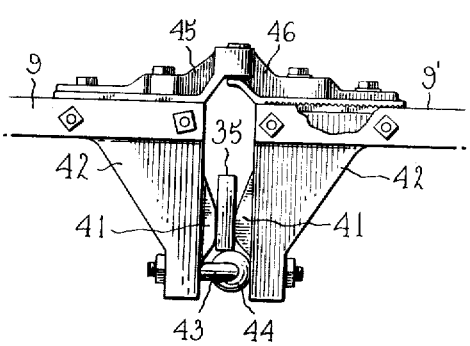
Figure 4 is a view upon an enlarged scale showing the manner in which the rear abutting ends of the rear disk gangs are connected with one another.

The rear end of the bar 35 extends between the inner abutting ends of the rear disk gangs, as best shown in Figure 4, and is held in a central position by projections 41 upon the inner surfaces of depending brackets 42 located at the inner ends of the frames 9, 9' of the rear disk gangs, and is supported by a hinge connection between the lower ends of the brackets 42 provided by interlocking hook and eye members 43, 44, whereby a universally movable joint is provided between the lower ends of the said brackets 42; from which it follows that the rear end of the adjusting bar is held in position by the projections 41 and is supported by the hinge members 43, 44 upon which it rests, and that the cross bar 38 is supported by the bar 35 through the bolt 39 which extends through the lugs 37 and the said bar.

Secured to the upper sides of the frame members 9, 9' of the rear disk gangs are two bumpers 45, 46, the inner end of the bumper 45 being forked and the inner end of the bumper 46 being rounded and fitting between the arms of the fork, as best shown in Fig. 1. The bumper 46 is secured in place through an adjustable connection provided by slots formed therein, and has teeth upon its surface, as shown, in order that it may be placed in various positions and secured in place in the various positions in which it may be adjusted. The purpose of this construction is to provide for either a flexible or a rigid connection between the inner ends of the rear disk gangs; it being appreciated that if the bumper 46 is so positioned that its end is in contact with the bumper 45 when the disk gangs are in substantially the same plane, then any upward movement of the free outer end of either disk gang will be communicated to the other gang and both will tilt as a single unitary structure, while if the inner ends of the bumpers are spaced apart, then either disk gang may tilt independently of the other gang.

It will be appreciated that the points of connection between the hinge members 43, 44 and the points of contact between the inner ends of the bumpers 45, 46 are spaced apart a considerable distance vertically, so that the rigid connection above referred to may be secured without unduly straining the connection provided by the members in question; and it will be further appreciated that the rear end of the adjusting bar 35 will be supported by the hinge members 43, 44 and held centrally by the projections 41 in all positions which the rear disk gangs may assume when the harrow is in use.

The adjusting bar 35 obviously extends above the upper limits of the forward disk gangs 5, 5' as best shown in Fig. 2, and is then bent downward to cause its rear end to rest upon the members 43, 44 as above pointed out. The crossbar 38 lies about on the level of the shafts 7, 7' whereby the disks of the rear disk gangs are carried, and the links 40 through which the ends of said cross bar are connected with the inner abutting ends of the rear disk gangs, each preferably comprises two members, as shown in Fig. 2, one extending to the top of the frame of the disk gang and the other to the shaft thereof to thereby prevent tipping of the disk gangs, as will be appreciated.

The front ends of the draw bars 28, 28' are preferably connected with the block 18 at points spaced apart from one another, as clearly shown in Fig. 1, thus providing a construction in which the rear disk gangs will follow the front gangs better, and provides a harrow in which the ground is better acted upon by the disks than would be the case if a single point of connection was provided between the front ends of the draw bars and the draft frame of which the block 18 is obviously a part.

The loose connection provided between the rear end of the bar 35 and the inner abutting ends of the rear disk gangs permits the front end of the said adjusting bar to swing freely in a horizontal plane, as, for instance, when the direction of movement of the harrow is changed; in which case the cross bar 38 moves sideways with the bar as the bar swings from one side to the other, as will be appreciated. This capability of universal movement at the point of connection with the rear disk gangs permits the draft frame and the front disk gangs to turn to a considerable angle independent of the rear disk gangs without introducing a binding action at the point of connection between the bar 35 and the said rear gangs, and without materially changing the angular arrangement of the two sets of disk gangs relative to the line of draft of the harrow or relative to one another, and facilitates the turning of the harrow at the corners of a field or at other places where the direction in which the same is advancing has to be changed to a considerable extent.

The points of pivotal connection between the several disk gangs and the draw bars 26, 26' and 28, 28' through which the pull is communicated to them is preferably beyond the center of the gangs, thus providing a harrow in which the tractive force is communicated to each disk gang at a point somewhat beyond the center thereof, measured outward from the central line of the harrow. In such a case a second tractive force is also obviously communicated to said disk gangs at their inner ends through the adjusting bars 32, 32' and 35, which last mentioned tractive forces are balanced through the adjusting lever 20; from which it follows that upon unlatching the adjusting lever the inner ends of the several disk gangs may be moved toward or from one another to thereby vary the angular positions of said gang relative to the center line or line of travel of the harrow with the expenditure of comparatively little force applied to the lever.

The force necessary to accomplish the adjustment of the several disk gangs is further reduced because of the fact that the rear end of the draw bar 24 is connected with the adjusting lever 20, thereby providing a construction in which the force exerted by the operator and necessary to adjust the inner ends of the disk gangs is reduced to a minimum; for, upon unlatching the bar 20, the tractive force applied to the harrow though the draw bar 24 and which so long as the lever is locked to the segments 19, 19' is communicated to the draft frame and through the draft mechanism to the several disk gangs, acts upon the said adjusting lever which is thus freed to swing the same about the pivotal support 21. This tractive force when the lever is unlocked obviously acts to pull the inner ends of the forward disk gangs ahead while the corresponding ends of the rear disk gangs move rearward, thus effecting the angular adjustment of the two pairs of disk gangs by force derived from the tractor whereby the harrow is drawn and, when the parts are properly proportioned, relieves the operator of substantially all effort in effecting the adjustment of the gangs; it being appreciated that the fact that the front gangs are operating in unworked soil introducing a condition of affairs which would render it extremely difficult to move the inner ends of the said front gangs forward were it not that such movement is assisted, and in fact for all practical purposes accomplished in its entirety, by the tractive force communicated to the harrow through the clevis 12 and draw bar 24 to the said adjusting lever 20. When the adjusting lever is latched in any given position the parts of the draft mechanism as a whole will obviously be locked rigidly relative to one another, and the pull upon the several disk gangs will be communicated to them for the most part through the draw bars 26, 26' and 28, 28', although to a lesser extent through the adjusting bars 32, 32' and 35.

It will be appreciated that the rear disk gangs may be removed by disconnecting the connections between the adjusting bar 35 and the lever 20 at 36, and between the draft bars 28, 28' and the block 18 at 29, 29', thus providing a construction in which the forward disk gangs may be used alone and without the rear gangs. When so used it will be obvious that the tractive force is communicated to the forward gangs for the most part through the draw bars 26, 26', and to a lesser extent through the adjusting bars 32, 32', and that when the lever 20 is unlocked the tractive force becomes available for shifting the forward disk gangs to thereby vary their angular position relative to the line of travel of the harrow in substantially the same way as hereinbefore explained, because of the connection of the draw bar 24 with which the clevis 12 is connected and the adjusting lever 20.

Having thus described and explained my invention, I claim and desire to secure by Letters Patent:

1. In a tandem disk harrow of the class described, a draft frame; two angularly adjustable front disk gangs independent of and located behind said frame and one upon either side of the center line of the harrow, and each of which gangs comprises a plurality of disks; two angularly adjustable rear disk gangs similar to and located at the rear of said front gangs; draft mechanism intermediate said draft frame and said front disk gangs and through which said front gangs are drawn; other draft mechanism intermediate said draft frame and said rear disk gangs and through which said rear disk gangs are drawn; a single pivotally supported and vertically arranged adjusting lever carried by said draft frame; and two adjusting devices the front ends of which are connected with said adjusting lever one above the other below its point of pivotal support, and the rear ends of which extend to and are operatively connected one with both the inner ends of said front disk gangs, and the other with both the inner ends of said rear disk gangs.

2. In a tandem disk harrow of the class described, a draft frame; two angularly adjustable front disk gangs located one upon either side of the center line of the harrow and each of which comprises a plurality of disks; two angularly adjustable rear disk gangs similar to and located at the rear of said front gangs; draft mechanism connected with said several disk gangs adjacent their respective central portions and through which said gangs are drawn; a single pivotally supported and vertically arranged adjusting lever carried by said draft frame; means for locking said lever relative to said draft frame and in the various positions it may be made to assume; two adjusting devices the front ends of which are connected with said adjusting lever one above and the other below its point of pivotal support, and the rear ends of which extend to and are operatively connected one with both the inner ends of said front disk gangs, and the other with both the inner ends of said rear disk gangs; and a draw bar pivotally connected with said adjusting lever and through which the harrow is drawn.

3. In a tandem disk harrow of the class described, a draft frame; two angularly adjustable front disk gangs located one upon either side of the center line of the harrow and each of which comprises a plurality of disks; two angularly adjustable rear disk gangs similar to and located at the rear of said front gangs; draft mechanism connected with said several disk gangs adjacent their respective central portions and through which said gangs are drawn; a single pivotally supported and vertically arranged adjusting lever carried by said draft frame; means for locking said lever relative to said draft frame and in the various positions it may be made to assume; two adjusting devices the front ends of which are connected with said adjusting lever one above and the other below its point of pivotal support, and the rear ends of which extend to and are operatively connected one with both the inner ends of said front disk gangs, and the other with both the inner ends of said rear disk gangs; and a draw bar operatively connected with said swinging lever and whereby the tractive force exerted through said bar is rendered available for moving said disk gangs to thereby vary their angular positions.

4. In a tandem disk harrow of the class described, a draft frame; two angularly adjustable front disk gangs located one upon either side of the center line of the harrow and each of which comprises a plurality of disks; two angularly adjustable rear disk gangs similar to and located at the rear of said front gangs; draft mechanism through which said several disk gangs are connected with said draft frame so as to be drawn thereby, the connections between said draft mechanism and said disk gangs being adjacent the central position of the respective gangs; a single pivotally supported and vertically arranged adjusting lever carried by said draft frame; means for locking said lever relative to said draft frame and in the various positions it may be made to assume; a draft bar the rear end of which is connected with said adjusting lever adjacent the point of pivotal support thereof; and two adjusting devices the front ends of which are connected with said adjusting lever one above and one below its point of pivotal support, and the rear ends of which extend to and are operatively connected one with both the inner ends of said front disk gangs and the other with both the inner ends of said rear disk gangs.

5. In a tandem disk harrow of the class described, a draft frame; two angularly adjustable front disk gangs located one upon either side of the center line of the harrow and each of which comprises a plurality of disks; two angularly arranged rear disk gangs similar to and located at the rear of said front gangs; draft mechanism intermediate said draft frame and said front disk gangs and connected with said front disk gangs adjacent their respective central portions and through which said gangs are drawn; other draft mechanisms independent of said first mentioned draft mechanism connected with said rear disk gangs adjacent their respective central portions and through which said last mentioned gangs are drawn; a single pivotally supported and vertically arranged adjusting lever carried by said draft frame and two adjusting devices the front ends of which are connected with said adjusting lever, and the rear ends of which extend to and are operatively connected one with both the inner ends of said front disk gangs and the other with both the inner ends of said rear disk gangs, and whereby the angular position of all said gangs may be simultaneously changed when said lever is swung upon its point of pivotal support.

6. In a tandem disk harrow of the class described, a draft frame; two angularly adjustable front disk gangs located one upon either side of the center line of the harrow and each of which comprises a plurality of disks; two angularly arranged rear disk gangs similar to and located at the rear of said front gangs; draft mechanism connected with said rear disk gangs adjacent their respective central portions and through which said gangs are drawn; a single pivotally supported and vertically arranged adjusting lever; and two adjusting devices the front ends of which are connected with said adjusting lever, and the rear ends of which extend to and are pivotally connected one with both the inner ends of said front disk gangs and the other with both the inner ends of said rear disk gangs, and whereby the angular position of all said gangs may be simultaneously changed when said lever is swung upon its point of pivotal support; and means whereby the tractive force communicated to the harrow is made available for assisting in the movement of said lever when the angular positions of said disk gangs are to be changed.

7. In a tandem disk harrow of the class described, two angularly adjustable disk gangs located one upon either side of the center line of the harrow and each of which comprises a plurality of disks; draft mechanism pivotally connected with said disk gangs adjacent their respective central portions and through which said gangs are drawn; a single pivotally supported adjusting lever; adjusting mechanism the front end of which is connected with said adjusting lever, and the rear end of which is operatively connected with the inner ends of both said disk gangs; and means whereby the tractive force communicated to the harrow is made available for assisting in the movement of the said lever when the angular positions of said disk gangs are to be changed.

8. In a tandem disk harrow of the class described, a draft frame; two angularly adjustable disk gangs located one upon either side of the center line of the harrow and each of which comprises a plurality of disks; draft mechanism extending between said draft frame and said disk gangs and pivotally connected therewith adjacent their respective central portions and through which said gangs are drawn; a single pivotally supported and vertically arranged adjusting lever carried by said draft frame; locking means for securing said lever in the various positions in which it may be placed; adjusting mechanism the front end of which is connected with said adjusting lever, and the rear end of which is operatively connected with the inner ends of both said disk gangs; and a draft bar operatively connected with said lever whereby the tractive force exerted upon the harrow is rendered available for assisting in the movement of said disk gangs when said adjusting lever is unlocked.

9. In a device of the class described, two angularly adjustable disk gangs each of which comprises a plurality of disks; draw bars pivotally connected with said disk gangs adjacent their central portions; means for pivotally connecting the inner portions of said disk gangs with one another and which connecting means is of such a character that said disk gangs may swing freely in a horizontal plane, but are restrained as regards vertical movement; an adjusting bar operatively connected with the inner ends of both of said disk gangs; and means for operating said adjusting bar to thereby swing said disk gangs about the pivotal points of support between them and the draw bars aforesaid whereby they are drawn.

10. In a device of the class described, two angularly adjustable disk gangs each of which comprises a plurality of disks; two draw bars pivotally connected one with each of said disk gangs adjacent the central portions of the said gangs; means for pivotally connecting the inner adjacent ends of said disk gangs with one another; an adjusting bar for swinging said disk gangs about the pivotal connections between them and the said draw bars; a cross bar; two lugs carried by said cross bar and between which said adjusting bar extends; a bolt extending through said lugs and through said cross bar; and links intermediate the ends of said cross bar and the inner ends of said disk gangs and through which movement imparted to said adjusting bar is communicated to said disk gangs.

11. In a device of the class described, two angularly adjustable disk gangs each of which comprises a plurality of disks; two brackets carried by said disk gangs and located at the inner ends thereof; means for providing a pivotal hinge connection between the lower ends of said brackets; and two bumpers located at the inner ends of said disk gangs and at a distance above the hinge connection aforesaid, and the inner ends of which bumpers are adapted to engage with one another.

12. In a device of the class described, two angularly adjustable disk gangs each of which comprises a plurality of disks; two brackets carried by said disk gangs and located at the inner ends thereof; means for providing a pivotal hinge connection between the lower ends of said brackets; and two bumpers carried by the inner ends of said disk gangs and spaced apart vertically from the hinge connection aforesaid, one of said bumpers having a forked extremity and the other having a rounded end adapted to fit between the branches of the forked extremity of the other bumper, one of said bumpers being adjustable relative to the disk gang whereby it is carried and relative to the other bumper.

13. In a tandem disk harrow of the class described, two angularly adjustable disk gangs located one upon either side of the center line of the harrow and each of which comprises a plurality of disks; draft mechanism connected with said disk gangs adjacent their respective central portions and through which said gangs are drawn; a single pivotally supported and vertically arranged adjusting lever; means for securing said lever in the various positions in which it may be placed; adjusting mechanism the front end of which is connected with said adjusting lever, and the rear end of which is operatively connected with both the inner ends of said disk gangs; and a draft bar whereby the harrow is drawn, the rear end of said draft bar being connected with said adjusting lever whereby the force exerted through said bar is rendered available for the purpose of assisting the operator in varying the angular positions of said disk gangs.

In testimony whereof I affix my signature.

ALVARO S. KROTZ.

Certificate of Correction.

It is hereby certified that in Letters Patent No. 1,409,218, granted March 14, 1922, upon the application of Alvaro S. Krotz, of Janesville, Wisconsin, for an improvement in "Tandem-Disk Harrows," errors appear in the printed specification requiring correction as follows: Page 2, line 30, for the word "gang" read *gangs*, and line 71, after the word "type" insert the word *properly;* page 5, claim 1, line 43, commencing with the word "intermediate" strike out all to and through the word "drawn", line 45, and insert the words *whereby said front disk gangs are drawn from said draft frame; other draft mechanism whereby said rear disk gangs are drawn from said draft frame;* page 6, lines 20, 21, and 22, claim 5, strike out the words "intermediate said draft frame and said front disk gangs and"; same page and claim, lines 24 and 28, after the word "portions" insert the words *and with said draft frame*, and line 25, for the word "mechanisms" read *mechanism;* and that the said Letters Patent should be read with these corrections therein that the same may conform to the record of the case in the Patent Office.

Signed and sealed this 7th day of November, A. D., 1922.

[SEAL.]

KARL FENNING,
*Acting Commissioner of Patents.*